(12) United States Patent
Keefe et al.

(10) Patent No.: US 8,912,251 B2
(45) Date of Patent: Dec. 16, 2014

(54) PROCESS OF HEAT TREATING STRUCTURED POLYMER PARTICLES

(71) Applicant: OMNOVA Solutions Inc., Fairlawn, OH (US)

(72) Inventors: Melinda H. Keefe, Midland, MI (US); James G. Galloway, Midland, MI (US); Ray E. Drumright, Midland, MI (US); Michael J. Devon, Midland, MI (US); Dwayne J. Nicholson, Sanford, MI (US)

(73) Assignee: OMNOVA Solutions Inc., Beachwood, OH (US)

( * ) Notice: Subject to any disclaimer, the term of this patent is extended or adjusted under 35 U.S.C. 154(b) by 0 days.

(21) Appl. No.: 14/067,380

(22) Filed: Oct. 30, 2013

(65) Prior Publication Data

US 2014/0080959 A1    Mar. 20, 2014

Related U.S. Application Data

(63) Continuation of application No. 12/445,953, filed as application No. PCT/US2007/085899 on Nov. 29, 2007, now abandoned.

(60) Provisional application No. 60/861,810, filed on Nov. 30, 2006.

(51) Int. Cl.
| | | |
|---|---|---|
| *C08F 2/16* | (2006.01) | |
| *C08L 51/00* | (2006.01) | |
| *C08L 33/08* | (2006.01) | |
| *C09D 151/00* | (2006.01) | |
| *B29C 44/34* | (2006.01) | |
| *C08F 285/00* | (2006.01) | |
| *C08F 265/04* | (2006.01) | |
| *C08J 9/20* | (2006.01) | |
| *C08J 9/22* | (2006.01) | |
| *C08F 265/00* | (2006.01) | |
| *C08F 265/02* | (2006.01) | |
| *C09D 7/12* | (2006.01) | |
| *C08F 265/06* | (2006.01) | |

(52) U.S. Cl.
CPC ............ *C09D 7/125* (2013.01); *C08J 2333/06* (2013.01); *C09D 151/003* (2013.01); *B29C 44/3461* (2013.01); *C08F 285/00* (2013.01); *C08F 265/04* (2013.01); *C08J 9/20* (2013.01); *C08J 9/22* (2013.01); *C08F 265/00* (2013.01); *C08F 265/02* (2013.01); *C08L 51/003* (2013.01); *C08F 265/06* (2013.01)
USPC ............ 523/201; 524/460; 524/560; 525/242

(58) Field of Classification Search
USPC ............. 521/60; 523/201; 524/575, 460, 560; 525/242
See application file for complete search history.

(56) References Cited

U.S. PATENT DOCUMENTS 5,273,824 A * 12/1993 Hoshino et al. .......... 428/402.24
5,521,253 A *  5/1996 Lee et al. ...................... 525/301

* cited by examiner

*Primary Examiner* — Kara Boyle
(74) *Attorney, Agent, or Firm* — Arthur M. Reginelli; David G. Burleson

(57) ABSTRACT

A process comprising heating an aqueous dispersion of first structured polymer particles at a temperature of at least about 155° C., optionally in the presence of a base and/or a swelling agent, to produce an aqueous dispersion of heat treated structured polymer particles.

15 Claims, 1 Drawing Sheet

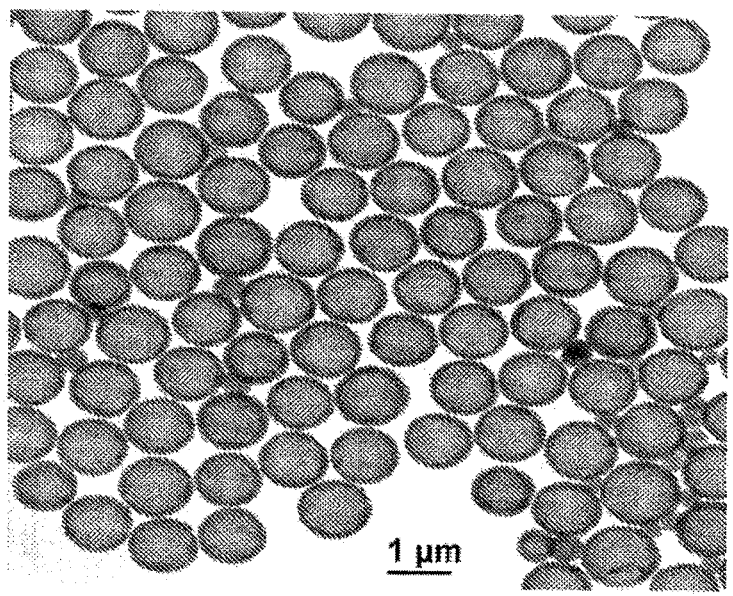

PROCESS OF HEAT TREATING STRUCTURED POLYMER PARTICLES

This application is a continuation application of U.S. Non-Provisional application Ser. No. 12/445,953, filed Apr. 17, 2009, which claims the benefit of International Application Serial No. PCT/US2007/085899, filed Nov. 29, 2007 and Provisional Application Ser. No. 60/861,810, filed Nov. 30, 2006, all of which are incorporated herein by reference.

BACKGROUND OF THE INVENTION

The invention relates to the heat treatment of structured polymers.

Structured particles, such as hollow particle latexes, are known to be useful as opacifying agents in coating applications such as architectural coating and paper coating. The use of structured hollow latexes in coatings reduces the need for expensive pigments, such as $TiO_2$, without adding excessive and undesirable weight to the coatings. The hollow latex particle provides opacity in paints because the hollow center scatters light more efficiently than a corresponding solid particle. The light scattering properties of the hollow latex particle are related to factors such as: the particle wet void fraction, void size, the difference in refractive index between the particle polymer and the internal void, and the ability of the hollow particle to maintain its structure in a paint film. Gloss performance in paper coating applications is directly related to the particle wet void fraction. Hollow latexes have additional utility in areas other than coatings, such as in processes involving microencapsulation, low density bulking aids, and insulation.

U.S. Pat. Nos. 4,427,836 and 5,157,084 disclose two different processes for preparing hollow latex particles. U.S. Pat. No. 4,427,836 discloses a process for making hollow latexes by a multi-step process involving preparing a core phase composed of hydrophilic acid-containing polymers, encapsulating the core with hydrophobic shell polymers and subsequently swelling at temperatures below 120° C. with a base. U.S. Pat. No. 5,157,084 discloses a separate process for making hollow latexes by a multi-step process involving preparing a core phase comprising hydrophilic ester-containing polymers, encapsulating the core with hydrophobic shell polymers, and subsequently hydrolyzing the ester core at a temperature below 150° C. with a permanent base.

The known methods of preparing voided latexes yield particles with suboptimal performance due to the formation of structures with limited wet void fraction, and/or imperfections in the particle void and shell. In view of the shortcomings of known processes, it would be desirable to have structured polymers having superior performance, and it would be desirable to have a method for increasing the wet void fraction and/or reducing or eliminating imperfections in the particle void and shell.

SUMMARY OF THE INVENTION

The process of the invention comprises such a method that involves heating an aqueous dispersion of first structured polymer particles at a temperature of at least about 155° C., optionally in the presence of a base and/or a swelling agent, to produce an aqueous dispersion of heat treated structured polymer particles.

Surprisingly, this process of treating structured latex particles yields improved latex particles displaying at least one enhanced characteristic, such as wet void fraction, architectural coating opacity or, when used in a paper coating, the ability to improve calendered gloss.

In one embodiment the invention includes a hollow particle latex having an average wet void fraction of at least 0.60.

The heat treated structured polymer produced by the process of the invention is useful in coatings, e.g. paints and paper coatings, as well as many other known applications.

BRIEF DESCRIPTION OF THE DRAWING

FIG. 1 is a photomicrograph of particles prepared according to one embodiment of the process of the invention, specifically the process of Example 3.

DETAILED DESCRIPTION OF THE INVENTION

The process of the invention in one embodiment involves heating a structured polymer particle at a temperature of at least about 155° C. in another embodiment of the invention, the invention involves expanding a core-shell polymer particle in an aqueous dispersion at a temperature of at least about 155° C. in order to prepare a hollow polymer particle. In yet another embodiment, the invention involves cooling a heated structured particle at a relatively slow cooling rate. The invention also contemplates any combination of these processes.

For the purposes of the present invention, the term "dry" means in the substantial absence of water and the term "dry basis" refers to the weight of a dry material.

For the purposes of the present invention, the term "copolymer" means a polymer formed from at least 2 monomers.

For the purposes of the present invention, the term "(meth)" indicates that the methyl substituted compound is included in the class of compounds modified by that term. For example, the term (meth)acrylic acid represents acrylic acid and methacrylic acid.

As used herein, the term "paper" also encompasses paperboard, unless such a construction is clearly not intended as will be clear from the context in which this term is used.

In the process of heat treating structured polymer particles, the process can employ as a first structured particle an expanded or unexpanded particle having multiple domains of different polymers such as, for example, a hollow particle or an unexpanded core-shell particle, or a mixture thereof. In one embodiment, the process involves heating an aqueous dispersion of a starting polymer. The aqueous dispersion advantageously is a synthetic latex. A synthetic latex, as is well known, is an aqueous dispersion of polymer particles prepared by emulsion polymerization of one or more monomers. The latex can have a monomodal or polymodal, e.g. bimodal, particle size distribution.

Structured particles, such as core-shell latex particles and hollow latex particles, are known in the art and can be prepared via known methods. As is known in the art, the core-shell particle can have an expandable or swellable core, and a hollow structured particle can be prepared from a core-shell particle by expanding the core. In one embodiment of the invention, the structured particles comprise at least one phase comprising a polymer having acidic and/or hydrolyzable functionality.

In the preparation of a core-shell particle, an expandable core advantageously is prepared by polymerizing a monomer mixture comprising at least one carboxylic acid-functional monomer and/or hydrolyzable ester monomer, e.g., the core can be prepared using: at least one acidic monomer, such as methacrylic acid; or at least one hydrolyzable ester, such as ethyl acrylate or methyl acrylate; or at least one monomer having both acid and hydrolyzable ester functionality, such as methyl fumarate or methyl maleate; or at least one hydrolyzable anhydride monomer, such as maleic anhydride; or a mixture of these monomers. Methods for the preparation of core-shell particles are well known to those skilled in the art. See, for example, U.S. Pat. Nos. 5,157,084; 5,521,253; 5,229,209; 4,427,836; 4,594,363; and 4,880,842; and US Published Patent Application 2005/0059748 A1; the teachings of which are incorporated herein by reference.

The core-shell latex can be made by means of emulsion polymerization. More specifically, the core-shell latex can be prepared by stages that create a core and shell structure that, subsequent to neutralization, forms a hollow particle. The core advantageously is prepared first and the shell or shells are polymerized subsequently. The core-shell latex advantageously has a swellable core and a shell sufficiently deformable to enable the core to swell but substantially retain its original structure upon drying, thus resulting in a hollow particle.

In one embodiment of the invention, the hollow latex contemplated by the present invention is prepared from a particle, that comprises an expandable core, an optional intermediate copolymer layer, and a copolymer shell. In one embodiment of the invention, the expandable core comprises a polymer with hydrolyzable and/or neutralizable functionality. "Hollow latex particles," as used herein, means latex particles that are not completely solid. The term "hollow latex" refers to a latex comprising hollow latex particles. Such particle morphology can include various void structures such as single or multiple uniform or nonuniform microvoids or hemispherical particles with voided centers. The preferred hollow latex particles are essentially spherical and have a centered void, with an average wet void fraction of from about 0.1 to about 0.9. Wet void fraction is the volume fraction of a particle that is not polymeric, and is determined as described hereinbelow. In one embodiment of the invention, the hollow particle has an average wet void fraction of from 0.4 to about 0.8.

Latex Monomers

Representative monomers that can be employed to produce latexes of the present invention include (meth)acrylate monomers, monovinyl aromatic monomers, aliphatic conjugated diene monomers, vinylidene halide or vinyl halide monomers, (meth)acrylonitrile, and vinyl esters of carboxylic acids containing from 1 to 18 carbon atoms, such as vinyl acetate or vinyl stearate. Mixtures of these monomers can be employed. Crosslinking agents can also be used to decrease the swellability of the polymer or for various other conventionally known reasons.

The term "(meth)acrylate" monomer includes conventionally known (meth)acrylates such as esters of (meth)acrylic acid represented by the formula $CH_2=CR'''COOR$, wherein $R'''$ is H or methyl, and R is a substituted or unsubstituted alkyl moiety of from 1 to 16 carbon atoms including, for example, substituted alkyls, such as those represented by the formulas $-CH_2Cl$; $-CH_2CH_2OH$; and

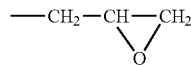

Thus, the term "(meth)acrylate" monomer as used herein is meant to include the monovinyl acrylate and methacrylate monomers. The (meth)acrylates can include esters, amides and substituted derivatives thereof. Generally, the preferred (meth)acrylates are $C_1$-$C_8$ alkyl acrylates or methacrylates. Examples of suitable (meth)acrylate monomers include methyl acrylate, ethyl acrylate, butyl acrylate, hexyl acrylate, 2-ethyl hexyl acrylate, octyl acrylate and iso-octyl acrylate, n-decyl acrylate, iso-decyl acrylate, tertbutyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethyl hexyl acrylate, octyl acrylate, iso-octyl acrylate, and methyl methacrylate.

The term "monovinyl aromatic" monomer, as used herein, is meant to include those monomers with a moiety of the formula

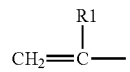

(wherein R1 is hydrogen or a lower alkyl such as an alkyl having from 1 to 4 carbon atoms) attached directly to an aromatic nucleus containing from 6 to 10 carbon atoms, including those wherein the aromatic nucleus is substituted with alkyl or halogen substituents. The preferred monovinyl aromatic monomers are styrene and vinyltoluene, with styrene being more preferred.

The term "aliphatic conjugated diene" monomer, as used herein, is meant to include compounds such as 1,3-butadiene, 2-methyl-1,3-butadiene, piperylene (1,3-pentadiene), other hydrocarbon analogs of 1,3-butadiene, and halogenated compounds such as 2-chloro 1,3 butadiene.

"Vinylidene halides" and "vinyl halides" suitable for this invention include vinylidene chloride and vinyl chloride. Vinylidene bromides and vinyl bromide can also be employed.

The term "monoethylenically unsaturated carboxylic acid" monomer, as used herein, is meant to include those monocarboxylic monomers such as acrylic acid, and methacrylic acid; and dicarboxylic acid monomers such as itaconic acid, fumaric acid, maleic acid, and their monoesters. The $C_3$-$C_8$ α,β-ethylenically unsaturated carboxylic acid monomers contemplated include monomers represented by the formula:

wherein R'' is H and R' is H, $C_1$-$C_4$ alkyl, or $-CH_2COOX$; R'' is $-COOX$ and R' is H or $-CH_2COOX$; or R'' is $CH_3$ and R' is H; and X is H or $C_1$-$C_4$ alkyl.

Acrylic acid and/or methacrylic acid, or a mixture thereof with itaconic or fumaric acid can be employed as monomers, as well as crotonic and aconitic acid and half esters of these and other polycarboxylic acids, such as maleic acid.

The term "crosslinking agent" or "crosslinking monomer" is meant to include monomers conventionally known in the art as useful for crosslinking polymerizable monomers. Examples of such monomers typically include di- or tri-functional monomers such as divinyl benzene, ethylene glycol dimethacrylate, 1,4-butylene glycol dimethacrylate, trimethylol propane trimethacrylate, allyl methacrylate and diene functional monomers such as butadiene. The crosslinking monomer optionally can be present in any phase of the particles of the present invention, e.g. in the core and/or shell stages.

Emulsion polymerization techniques are well known and, as is known in the art, latexes can be prepared using, for example, seeded or non-seeded emulsion polymerization processes including continuous, batch and semi-continuous (or semi-batch) processes. The temperature during emulsion polymerization can be any suitable temperature, and advantageously is from 50° C. to 150° C.; preferably 70° C. to 100° C. The polymerization time can be any suitable time and is dependent on factors known to those skilled in the art, including, for example, the pressure and temperature employed, and advantageously is from about 2 to about 10 hours.

Compositions of Polymer Particle Phases

A. The Core

The core of the polymer particles is a homopolymer or copolymer that is swell able upon neutralization or hydrolysis. At least one of the monomers polymerized to form the core must bear or result in a unit that can be hydrolyzed or neutralized with a base. Preferably at least about 10% by weight, more preferably at least about 25% by weight, of the monomers polymerized to form the core bear a moiety that is, or can be converted to, a hydrolysable or neutralizable unit. Examples of monomers suitable for the core include vinyl carboxylic acid monomers containing 1-10 carbon atoms, (meth)acrylate monomers, alpha olefins, monovinyl aromatic monomers, vinyl esters of carboxylic acids containing from 1 to 18 carbon atoms, and acrylonitrile. The core optionally can be crosslinked. Examples of monomers suitable as crosslinkers include aliphatic diene monomers, polyethylenically unsaturated aromatic monomers, polyethylenically unsaturated (meth)acrylates, and allyl esters of vinyl acid monomers containing 1-10 carbon atoms. Preferred monomers for core preparation include vinyl acid monomers containing 1-10 carbon atoms and (meth)acrylate monomers. Specific examples of preferred monomers for core preparation include acrylic acid, methacrylic acid, methyl acrylate, methylmethacrylate, and mixtures thereof. In a preferred embodiment, the core comprises, in polymerized form, from about 30 to about 70 weight percent methyl methacrylate with the remainder being methyl acrylate and/or methacrylic acid, based on the weight of the polymer of the core. The core advantageously is present in the core-shell latex in an amount of from about 2 to about 15 percent, preferably from about 4 to about 10 percent, by weight based on the total dry weight of the latex.

B. The Intermediate Shell Stages

The optional intermediate shell is a homopolymer or copolymer layer that provides a transition layer between the core and outermost shell polymer phases. More than one intermediate shell layer can be employed. In one embodiment of the invention, the intermediate shell comprises a polymer prepared from the same monomers described for the core, but the ratio of these monomers to each other is different for each intermediate shell, in that less hydrolyzable or neutralizable monomer is employed as one moves away from the core. Examples of preferred monomers for the optional intermediate shell include vinyl acid monomers containing 1-10 carbon atoms, (meth)acrylate monomers, acrylonitrile, alpha olefins, and monovinyl aromatic monomers. Specific examples of preferred monomers for intermediate shell preparation are acrylic acid, methacrylic acid, methylmethacrylate, acrylonitrile, styrene and mixtures thereof. In a preferred embodiment, the monomer composition for the intermediate shell comprises, in polymerized form, from about 70 to about 99 weight percent styrene with the remainder being acrylic acid, methacrylic acid, acrylonitrile, methylmethacrylate, or mixtures thereof, based on the weight of the polymer of the intermediate shell. The intermediate shell advantageously is present in the latex in an amount of from about 0 to about 90 percent by weight based on the total weight of the latex, on a dry basis. In one embodiment of the invention, the amount of the intermediate shell is from about 5 to about 20 weight percent based on the total weight of the latex, on a dry basis.

C. The Outer Shell Stages

The outermost shell can be a copolymer or homopolymer. The composition of the outermost shell preferably incorporates, in polymerized form, at least one of styrene; methyl methacrylate; methacrylic acid; acrylic acid, allyl methacrylate and/or divinyl benzene. Optionally, the outermost shell can also include thermoplastic or thermoset polymers that have been deposited via deposition or precipitation; examples of such polymers include epoxies, polyurethanes, optionally modified ethylene polymers and the like. The preferred amounts of the monomers employed in the outermost shell, based on 100 parts by weight of the total monomers used to form the outermost shell, are as follows: from about 75 to about 100 parts styrene; from about 0 to about 25 parts methyl methacrylate; from about 0 to about 3 parts methacrylic acid; from about 0 to about 3 parts acrylic acid; and from about 0 to about 5 parts allyl methacrylate and/or divinyl benzene, with the proviso that the total parts add to 100. The outermost shell can be present in the latex in an amount of from about 8 to about 98 percent by weight based on the total dry weight of the latex. In one embodiment, the amount of the outermost shell is from 75 to 98 weight percent of the dry weight of the finished particle. In another embodiment, the amount of the shell is from about 90 to about 96 percent. Whether expressed as parts or as percent, the total amount of the components for the structured particle, and for a given phase, e.g. core or shell, adds up to 100.

Preparation of the Latexes

The starting material for the heat treating step can be a structured particle such as, for example, a core-shell latex or a hollow latex. When the starting material is a core-shell latex, the process is conducted under conditions sufficient to expand the core-shell particles to produce a hollow latex. When the starting material is a hollow latex, the process is conducted under conditions sufficient to improve at least one property of the latex.

The heat treatment advantageously is conducted under conditions sufficient to create a higher wet void fraction, reduce imperfections in the void or the shell, and/or improve the opacity imparted by the particles. In one embodiment of the invention, the process is conducted under conditions such that the heat treated structured particles have at least one improved property compared to heat treated structured particles prepared from identical first structured particles that are heat treated at a lower temperature of the prior art with all other heat treatment conditions being equal. The heat treatment of the latexes advantageously is conducted at a temperature of at least 155° C., preferably at least 160° C., more preferably at least 165° C., even more preferably at least 170° C. and most preferably at least 180° C. The heat treatment of the latexes advantageously is conducted at a temperature of at most 250° C., preferably at most 200° C., more preferably at most 190° C. In one embodiment of the invention, the peak temperature of the heat treatment is at least about 50° C. higher than the glass transition temperature of the outermost shell polymer. The heat treatment time is a time that is sufficient, in conjunction with the temperature employed, to achieve the desired degree of expansion or property improvement, and advantageously is from a few minutes, such as 2 minutes, to about 10 hours. Higher heat treatment temperatures allow the process to reach completion sooner. The heat treatment temperature can vary during the process. In one embodiment of the invention, the heat treatment step is conducted in a process vessel, such as a reactor or a non-reactor. Advantageously, the heat treatment step is conducted under pressure in a process vessel capable of allowing the treatment to be conducted at higher than atmospheric pressure.

The expansion of core-shell particles is conducted under conditions sufficient to expand at least some, but preferably all of, of the core-shell particles. The expansion of core-shell particles can be achieved by exposing the latex to a base in an amount sufficient to neutralize and/or hydrolyze from at least about 10% to about 500 of the acid and hydrolyzable ester moieties in the particles. Preferably, the amount of base is sufficient to neutralize and/or hydrolyze from about 25% to about 300%, more preferably from about 50% to about 200%, of the acid and hydrolyzable ester moieties in the particles. The expansion of the core-shell latex to produce a hollow morphology particle preferably is conducted in a post-polymerization step, but can be at least partially conducted during the later stages of polymerization. The heat treatment optionally is at least partially conducted prior to neutralization or hydrolysis. In one embodiment of the invention, an expanded core-shell product of the process has a panic surface that is substantially free of holes.

The base can be volatile or non-volatile and can be organic or game. Many bases are well-known and widely commercially available. Examples of bases include, for example, LiOH, NaOH, KOH, sodium carbonate, potassium carbonate, ammonia, ammonium hydroxide, and volatile lower aliphatic amines, such as triethylamine, trimethylolamine and trimethylamine. The base preferably is a strong base, i.e. a base having a $pK_b$ of not greater than about 4. Mixtures of bases can be employed. The use of a base is optional when the heat treatment is applied to structured particles that are already voided or hollow.

A swelling agent optionally can be employed to aid the swelling in the expansion step. If employed, the swelling agent is employed in an amount sufficient to soften the intermediate and/or shell layer(s) of the core-shell particle. Examples of suitable swelling agents include toluene, benzene, THF, styrene, and the like. If a swelling agent is employed, it is advantageously separated from, or in the case of a monomeric swelling agent such as styrene, polymerized into and/or separated from, the latex prior to latex use, although it can remain in the latex for certain applications.

It has been discovered that controlling the cooling rate following heat treatment can have a beneficial impact on the properties of the heated product. Cooling can be either active or passive. Following heat treatment, the structured particles advantageously are cooled at a positive average cooling rate of not more than about 2° C. per minute, preferably from about 0.05° C. per minute to less than about 2° C. per minute, more preferably from about 0.1° C. per minute to less than about 0.5° C. per minute, from the elevated temperature down to a temperature that is at or below the Tg of the shell polymer. The cooling rate can be linear or nonlinear. This average cooling rate advantageously is applied in a 50° C. temperature range that encompasses the Tg of the shell polymer. In a preferred embodiment of the invention, the average cooling rate is applied to the structured particle over at least the temperature range that is from at least about 20° C. above the Tg of the shell polymer down to a temperature that is at least about 15° C. below the Tg of the shell polymer. For the purposes of the invention, the Tg used is that given by the well-known Fox equation.

Advantageously, the heat treated particle of the invention has an average wet void fraction of at least about 0.30. In one embodiment of the invention, a heat treated particle having an average wet void fraction of at least about 0.60 is produced. Preferably, a heat treated particle having an average wet void fraction of at least about 0.65, more preferably at least about 0.70, and even more preferably at least about 0.75, is produced.

The hollow polymer particles of the invention can be used in known applications for hollow polymer particles. For example, they are useful in coating compositions and can be employed in the wet end of the paper making process. The hollow particles can be used in the preparation of coating formulations, such as paints and paper coating colors. Architectural coating compositions, e.g. paints, are well known in the art, as is the use of hollow latex particles in the preparation of such compositions. Hollow latex particles provide opacity to dried paint films by effectively scattering incident light. The process of the invention may provide hollow latex particles with improved opacity performance in coatings compared to existing hollow latexes.

Paper coating colors as typically known in the art can be formulated with a filler, e.g. a clay, a pigment (such as hollow latex particles), and a binder, e.g. a styrene/butadiene latex binder. The process of the invention surprisingly may provide hollow latex particles with improved calendered gloss performance in paper coatings compared to existing hollow latexes.

If desired, one or more conventional additives may be incorporated into the coating compositions in order to modify the properties thereof. Examples of these additives include thickeners, dispersants, dyes and/or colorants, biocides, antifoaming agents, optical brighteners, wet strength agents, lubricants, water retention agents, crosslinking agents, surfactants, and the like.

Specific Embodiments of the Invention

The following examples are given to illustrate the invention and should not be construed as limiting in scope. All parts and percentages are by weight unless otherwise indicated.

Test Methods

Average Particle Diameter

The average wet particle size, or average particle diameter, of a latex is measured by hydrodynamic chromatography (HDC).

Average Wet Void Fraction

The wet void fraction is determined using the following procedure. To a 50 milliliter polypropylene centrifuge tube (with hemispherical bottom) is added 40 grams of latex. The tube is placed in a centrifuge and is spun at 19,500 rpm for 180 minutes. The supernatant is decanted and weighed. From the latex mass, percent solids, and supernatant mass the wet void fraction ($f_{void}$) is determined using the following equations:

$$f_{void} = \frac{(V_T - S_{H2O}) \times F_R - V_P}{(V_T - S_{H2O}) \times F_R}$$

where:

$V_P$=Polymer volume (polymer mass/polymer density) where the density of copolymers is calculated using literature values for the density of the homopolymer of each monomer, and assuming that the density of the copolymer is a linear function of the composition of the copolymer. See. Peter A. Lovell and Mohamed S. El-Aasser, "Emulsion Polymerization and Emulsion Polymers": p. 624, John Wiley and Sons: New York (1997).

$V_T$=total volume in the tube (mass latex/density of latex)

$S_{H2O}$=volume of supernatant=weight of supernatant.

$F_R$=packing factor equals 0.64 for random packing of essentially monodisperse spheres. The packing factor is a correction corresponding to the volume fraction of solids in the hard pack.

Core-Shell Latex Preparation 1

A 23% solids expandable core latex with a pH of 2.4 is prepared by a persulfate initiated, seeded, semi-batch emulsion polymerization at 80° C. Methyl methacrylate (382.8 g), methacrylic acid (277.2 g), and sodium alkyl benzene sulfonate (2.8 g) are added over 2 hours to a reactor charged with water (2358 g), seed latex (0.39 g), and sodium persulfate (3.1 g). After completion of the reaction, the reactor is cooled and the resulting latex is removed from the reactor.

A 28.3% solids core-shell latex with a pH of 2.1 is prepared by a persulfate initiated, seeded, semi-batch emulsion polymerization at 92° C. Styrene (733.6 g) and acrylic acid (8.5 g) are added over the course of 100 minutes to a reactor charged with water (1713 g), the expandable core latex prepared as described above (192.2 g), and sodium persulfate (3.27 g). During monomer addition, water (112.3 g) and sodium alkylbenzene sulfonate (0.71 g) are also added. After completion of the reaction, the reactor is cooled and the resulting latex is removed from the reactor.

Comparative Experiment 2 (Not an Embodiment of the Invention)

Voided latex particles are prepared from the core-shell latex particles of Core-shell Latex Preparation 1 by neutralizing the core polymer. A pressure reactor is charged with the core-shell latex (100 g), water (45 g), sodium hydroxide (0.9 g), and sodium alkyl sulfonate (0.6 g). The mixture is heated at 140° C. for 10 hours and then cooled to room temperature at an average cooling rate of about 0.6° C./min. The voided latex has an average particle diameter of 1300 nm, 25% solids, average wet void fraction of 0.49, and pH of 12.5.

Example 3

A pressure reactor is charged with 100 g of core-shell latex of Core-shell Preparation 1, water (45 g), sodium hydroxide (0.9 g), and sodium alkyl sulfonate (0.6 g). The mixture is heated at 180° C. for 10 hours and then cooled to room temperature at an age cooling rate of about 0.8° C./min. The voided latex has an average particle diameter of 1400 nm, average wet void fraction of 0.63, and pH of 10.5.

Core-Shell Latex Preparation 4

A 42% solids hydrolyzable, expandable core latex with a pH of 2.7 is prepared by a persulfate initiated, seeded, semi-batch emulsion polymerization at 100° C. according to the method of U.S. Pat. No. 5,157,084. Methyl methacrylate (1410.6 g) and methyl acrylate (1021.5 g) the added over 3 hours to a reactor charged with water (2456 g), seed latex (1.41 g), and VERSENOL 120 (a chelating agent available from The Dow Chemical Company) (0.45 g). During the monomer addition, water (503 g), sodium alkylbenzene sulfonate (10.2 g), sodium persulfate (6.8 g), and sodium bicarbonate (0.4 g) are also added. After completion of the reaction, the reactor contents are cooled and the resulting latex is removed from the reactor.

A 45% solids core-shell latex with a pH of 5.0 is prepared by a persulfate initiated, seeded, semi-batch emulsion polymerization at 80° C. according to the method of U.S. Pat. No. 5,157,084. Accordingly, styrene (1688 g) and acrylic acid (13 g) are added over the course of 160 minutes to a reactor charged with water (2018 g), the hydrolyzable, expandable core latex prepared in the preceding paragraph (453.6 g), DOWFAX 2A1 (a surfactant available from The Dow Chemical Company) (1.1 g), sodium persulfate (5.88 g), and VERSENOL 120 (1.1 g). Styrene (445 g) then is added to the reactor over the course of 40 minutes. During both monomer additions, water (713 g), sodium alkylbenzene sulfonate (10.04 g), sodium persulfate (3.92 g), and sodium bicarbonate (1.7 g) are also added over the course of monomer addition. After completion of the reaction, the reactor contents are cooled and the resulting latex is removed from the reactor.

Comparative Experiment 5A (Not an Embodiment of the Invention)

Voided latex particles are prepared from the core-shell latex of Core-shell Latex Preparation 4. A pressure reactor is charged with the core-shell latex (2426 g), water (1635 g), sodium hydroxide (20.3 g), and sodium alkyl benzene sulfonate (13.8 g). The mixture is heated at 140° C. for 5 hours and then cooled to room temperature at an average cooling rate of about 0.2° C./min. The voided latex has an average particle diameter of 750 nm, 25% solids, average wet void fraction of 0.39, and pH of 12.3, and is designated as Latex 5A.

Example 5B

A pressure reactor is charged with the core-shell latex of Core-shell Latex Preparation 4 (2426 g), water (1635 g), sodium hydroxide (20.3 g), and sodium alkyl benzene sulfonate (13.8 g). The mixture is heated at 160° C. for 5 hours and then cooled to room temperature at an average cooling rate of about 0.2° C./min. The voided latex has an average particle diameter of 750 nm, 25% solids, average wet void fraction of 0.43, and pH of 10.5, and is designated as Latex 5B.

Example 5C

Example 5B is repeated except that the latex is cooled from 160° C. to 60° C. at an average cooling rate of 10° C. per minute. The latex is determined to have an average wet void fraction of 0.42, pH of 8.8 and 25% solids, and is designated as Latex 5C.

Example 5D

Example 5B is repeated except that the latex is cooled from 160° C. to 60° C. at an average cooling rate of 0.2° C. per minute. The latex is determined to have an average wet void fraction of 0.43, pH 8.3 and 25% solids, and is designated as Latex 5D.

Coating Results

The opacifying power of hollow latexes 5A, 5B, 5C and 5D are evaluated in coatings as follows.

Each hollow latex (13 parts) is blended with 87 parts of a (99.5%/0.5%) mixture of a latex binder UCAR 625 (an acrylic latex available from The Dow Chemical Company) and CELLOSIZE ER-15M (a hydroxyethyl cellulose thickener available from The Dow Chemical Company), and these blends are formulated to 34.5% solids. Coatings are made on Mylar® films with a 3 mil bird bar. The opacity of the air-dried latex blend coatings is measured on Byk-Gardener, Model MiniScan XE Plut color-guide 45°/0° in terms of contrast ratio (ASTM D 2805-88). The opacities of the coatings containing the hollow latex products are summarized in Table 1. Differences of 0.002 are significant in the test. Differences of 0.015 are significant for application development.

These results demonstrate that the hollow latex particles prepared using the higher temperature heat treatment process of the invention surprisingly exhibit improved opacity performance compared to Latex 5A, which is prepared at a lower treatment temperature. The results also show the best performance for Latexes 5B and 5D, which are cooled at a slow cooling rate.

TABLE 1

Opacity Results

| Latex | Coating Opacity # | | | |
|---|---|---|---|---|
| | 5A* | 5B | 5C | 5D |
| Opacity | 0.63 | 0.68 | 0.66 | 0.70 |

*Not an embodiment of the invention.

The invention claimed is:

1. A process for producing an aqueous dispersion of hollow particles, the process comprising the steps of:
   a. forming a plurality of polymer particles that are swellable upon neutralization or hydrolysis;
   b. encapsulating the plurality of polymer particles by polymerizing monomer including styrene at a temperature of 50° C. to 80° C. to thereby form a plurality of core-shell particles; and
   c. heating the core-shell particles to a temperature of 140° C. to 200° C.
   d. cooling the polymer particles from the peak heat treatment temperature to a temperature at or below the Tg of the shell polymer at a rate of not greater than about 2° C. per minute.

2. The process of claim 1, where said step of heating the core-shell particles is conducted at a temperature of at least 155° C.

3. The process of claim 1, where said step of heating the core-shell particles is conducted at a temperature of at least 160° C.

4. The process of claim 1, where said step of heating the core-shell particles is conducted at a temperature of at least 165° C.

5. The process of claim 1, where said step of heating the core-shell particles is conducted at a temperature of at least 170° C.

6. The process of claim 2, where said step of heating the core-shell particles takes place at a temperature of at most 190° C.

7. The process of claim 1, wherein said step of encapsulating a plurality of polymer particles includes polymerizing monomer consisting essentially of styrene to form a polystyrene shell, and where said step of heating the core-shell particles takes place at a temperature at least 50° C. higher than the glass transition temperature of the polystyrene shell.

8. The process of claim 1, wherein the core-shell particles are expanded during the heating step.

9. The process of claim 1, where said step of heating takes place in the presence of a base or swelling agent.

10. The process of claim 1, where the hollow particles have an average wet void fraction of at least about 0.30.

11. The process of claim 1, wherein the plurality of polymer particles that are swellable upon neutralization or hydrolysis are prepared from monomer selected from the group consisting of (meth)acrylate monomers and vinyl carboxylic acid monomers.

12. The process of claim 1, wherein the monomer includes at least 30 wt. % methyl methacrylate based on the total weight of the monomers.

13. The process of claim 1, wherein said step of heating takes place in the presence of a base.

14. The process of claim 13, wherein the base includes at least one of LiOH, KOH, and NaOH.

15. The process of claim 1, wherein said step of encapsulating by polymerizing monomer including styrene takes place at a temperature of at least about 70° C. up to 80° C.

* * * * *